Patented Mar. 21, 1933

1,902,256

UNITED STATES PATENT OFFICE

WILLIAM HENRY MOSS, OF CUMBERLAND, MARYLAND, ASSIGNOR TO CELANESE CORPORATION OF AMERICA, OF NEW YORK, N. Y., A CORPORATION OF DELAWARE

COATING COMPOSITION AND FILM PRODUCED THEREBY

No Drawing.   Application filed March 3, 1928.   Serial No. 259,000.

This invention relates to coating compositions containing derivatives of cellulose and particularly to a new and improved synthetic resin for use in the same prepared from acetone and furfural.

An object of my invention is to provide a coating composition containing derivatives of cellulose and particularly organic substitution derivatives of cellulose that produces clear, homogeneous, hard, tough films.

A further object of my invention is to provide a suitable resin for lacquers containing organic substitution products of cellulose such as cellulose acetate, which resin is compatible with the other constituents of the lacquers and which produces clear solutions which, upon drying, form films that are adherent, tough, hard and water repellent.

The preparation of a lacquer containing organic derivatives of cellulose such as cellulose acetate as the main constituent of the lacquer base, which lacquer is to be applied to a hard, smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced become cloudy and unhomogeneous.

I have found that the synthetic resins produced from acetone and furfural are compatible with cellulose acetate and that when added to lacquers containing cellulose acetate, they form clear solutions that, upon drying, produce clear, hard, tough and firmly adherent films which in the undyed or unpigmented form, vary from almost colorless to light brown.

The selection of a suitable resin for a lacquer containing the organic derivatives of cellulose presents a difficult problem because the resin must be compatible with the organic derivative such as cellulose acetate, both in solution and in the dry films and also with softeners, pigments and dyes which may be added to produce desired effects and variations of the films. In general, a synthetic resin for this purpose would be easily prepared from preferably cheap materials; it should be easily freed from any catalysts, whether acid or alkaline, used in its preparation; it should of itself be practically neutral and should be strongly resistant to water and free from water soluble materials. It should be hard and solid at ordinary temperatures, and its solutions from volatile solvents should dry quickly and completely when applied as a film without a long continued retention of low boiling point solvents such as sometimes occurs with phenol formaldehyde resins.

I have found that the resins prepared from acetone and furfural in the presence of suitable catalysts, and preferably alkaline catalysts, can be used as above stated in cellulose derivative lacquers.

In accordance with my invention, I prepare a synthetic resin formed by the condensation of furfural with a ketone. This synthetic resin is then used for making a lacquer or coating composition, which contains one or more derivatives of cellulose and a volatile solvent. The lacquer may also contain one or more natural or semi-synthetic resins or gums, one or more plastifiers or softening agents, medium and/or high boiling solvents and preferably, but not necessarily some pigments and/or dyes.

The synthetic resin of the acetone furfural type may be prepared in the presence of any suitable catalysts, but I have found it preferable to use alkaline catalysts. Although I prefer to use acetone as the ketone to prepare the resin, other ketones such as ethyl methyl ketone or diethyl ketones may be used.

The cellulose derivative may be an inorganic ester such as cellulose nitrate but I prefer to use organic derivatives of cellulose such as organic esters of cellulose or cellulose ethers. Examples of organic esters of cellulose are cellulose acetate, cellulose formate, cellulose propionate and cellulose butyrate. Examples of cellulose ethers are ethyl cellulose, methyl cellulose and benzyl cellulose.

The natural gums or resins or semisynthetic resins that may be used in the coating composition are many. Of the natural gums or resins that may be used the following may be mentioned: manila, accaroides, pontianak, kauri, dammar, rosin or shellac. An example of a semisynthetic resin is ester gum which is the glycerol ester of rosin.

Of the plastifiers or softeners that may be used the following are given by way of example: diethyl phthalate, tricresyl phosphate, triphenyl phosphate, amides such as mono methyl toluene sulphonamide, triacetin, diphenylol propane, thiocarbanilid, etc.

Examples of medium and/or high boiling solvents are ethyl acetate, ethyl lactate, tetrachlorethane, benzyl alcohol or diacetone alcohol. Obviously other suitable mediums or high boiling solvents may be used. The low boiling solvents may be any one or a mixture of two or more of any of the following liquids: acetone, alcohol (ethyl or methyl) benzene or ethylene dichloride. The pigments or dyes used may be any of the pigments or dyes ordinarily used in the paint or lacquer industry that are suitable for the purpose.

The following is given as an example of the method of preparing the ketone-furfural resin.

| | Parts |
|---|---|
| Furfural, by volume | 100 |
| Acetone | 100 |
| 50% caustic soda solution | 4 | are heated under reflux from 30 minutes to one hour. A yellow resin is rapidly formed. It is washed with water, with or without the addition of acid, to remove the alkali used as catalyst. It may be steam distilled or distilled at atmospheric pressure or under vacuum, or it may be dried in any well known manner. The crude resin has a strong characteristic odor which decreases as the purification is prolonged. The resin is soluble in acetone, benzene, toluene, partly soluble in alcohol and very little soluble in dilute caustic soda solution. The clear resin freed from water by distillation is brown in color and has a melting point of 90–100° C.

The solution of the resin in acetone is entirely miscible with solutions of cellulose acetate in the usual solvents, and the lacquers produced by addition of this resin to cellulose acetate give, on application to metal, wood, etc., clear, hard, well-stuck films such as are well suited for protective finishes.

The resin may be dissolved alone in any suitable solvent or mixture of solvents, and the solution thus produced may be added to a solution of cellulose derivative in the same or other solvents and plasticizers, dyes, pigments, stabilizers, may be added to either or both solutions or to the mixed solution, or the resin and the cellulose derivative may be dissolved together in the desired solvents or mixtures of solvents or mixture of substances which are themselves nonsolvents for cellulose acetate and resin, but which become solvents when mixed together, and dyes, pigments, and plasticizers, may be added as desired, at any stage in the above proceedings.

Further, I have found that the above resin is especially desirable for admixture with other synthetic resins and natural resins, the said mixtures of resins being also compatible with cellulose acetate in solutions, lacquers, plastic masses and films.

Thus the resin may be mixed with phenol formaldehyde type resins, preferably with those prepared in the presence of an acid catalyst, with phenol furfural resins, with aniline furfural resins, the mixed resins being, as stated, compatible with cellulose acetate in solutions, lacquers and films. These mixtures are especially useful when a light fast resin is desired, for, whereas the phenol formaldehyde type of resin generally darkens on exposure to sunlight or ultra-violet light, the furfural acetone resins soon become lighter in color on such exposure and thereafter remain light colored and light fast. Thus, mixtures of the two resins may be made, which are substantially light fast, the furfural acetone resin having the property of not only becoming light colored and light fast itself but also of holding the phenol formaldehyde resin mixed with it in the same state.

Thus also the acetone-furfural resin may be mixed with natural resins such as kauri, pontianak, manila, dammar, rosin and semi-artificial resins such as ester gum, all of which mixtures are compatible with cellulose acetate in solutions, lacquers films, plastic masses, although the said natural resins and ester gum are not of themselves compatible with cellulose acetate.

These admixtures of natural and synthetic resins with the acetone-furfural resin may be made in any way. They may be mixed, fused or ground together, dissolved together in suitable solvents or dissolved separately and their solutions mixed together, or the said solutions mixed with cellulose acetate solutions to form lacquers; and dyes, pigments, softeners, etc., may be added as desired.

The following examples are given as illustrations of lacquers, but it is to be understood that the proportions and the constituents may be widely varied, as is well known to one skilled in the art:

*Example I*

| | Parts |
|---|---|
| Cellulose acetate | 10 |
| Acetone furfural synthetic resin | 10 | are dissolved in 100 parts of a solvent. This solvent may be acetone alone or it may be a mixture made up as follows:

| | Parts |
|---|---|
| Acetone | 50 |
| Benzene | 25 |
| Alcohol (ethyl or denatured) | 25 |

If desired, 20 parts of ethyl lactate may be added to either of the above lacquers. Instead of using 10 parts of acetone furfural resin, 30 parts of the same may be used in the above described lacquers.

*Example II*

A coating composition may be made of the following composition:

| | Parts |
|---|---|
| Cellulose acetate | 20 |
| Acetone furfural synthetic resin | 5 |
| Acetone | 50 |
| Ethyl acetate | 20 |
| Benzene | 30 |
| Benzyl alcohol | 5 |

*Example III*

A coating composition may be made as follows:

| | Parts |
|---|---|
| Cellulose acetate | 7 |
| Acetone furfural synthetic resin | 7 |
| Diethyl phthalate | 4 |
| Tricresyl phosphate | 2 |
| Acetone | 50 |
| Alcohol | 25 |
| Benzene | 25 |
| Toluene | 10 |
| Ethyl lactate | 15 |

To this lacquer may be added 5 to 10 parts of pigment and/or 1 to 2 parts of dye.

*Example IV*

A coating composition that produces light fast films is made up as follows:

| | Parts |
|---|---|
| Cellulose acetate | 10 |
| Acetone furfural resin | 5 |
| Phenol formaldehyde resin | 5 |
| Acetone | 100 |

Instead of using acetone alone as the solvent, the following solvents may be used:

| | Parts |
|---|---|
| Acetone | 50 |
| Benzene | 25 |
| Alcohol | 25 |
| Ethyl lactate | 20 |

*Example V*

The following is an illustration of a coating composition containing an acetone furfural resin and a natural resin.

| | Parts |
|---|---|
| Cellulose acetate | 10 |
| Acetone furfural resin | 10 |
| Natural resin e. g. manila | 5 |
| Acetone | 40 |
| Ethyl acetate | 30 |
| Benzene | 10 |
| Diacetone alcohol | 10 |

To this may be added 5 parts of diethyl phthalate as softener. If a colored lacquer is desired 5 to 10 parts of pigment and/or 1 to 5 parts of dye may be added.

*Example VI*

Another illustration of a lacquer that produces light-fast films is the following:

| | Parts |
|---|---|
| Cellulose acetate | 15 |
| Acetone furfural resin | 10 |
| Phenol formaldehyde resin | 5 |
| Ester gum | 5 |
| Diethyl phthalate | 10 |
| Triacetin | 5 |
| Pigment | 15 |
| Dye | 5 |
| Acetone | 150 |
| Benzene | 50 |
| Alcohol | 50 |
| Ethyl lactate | 20 |
| Diacetone alcohol | 20 |

*Example VII*

| | Parts |
|---|---|
| Cellulose acetate | 10 |
| Acetone furfural resin | 5 |
| Phenol furfural resin | 5 |
| Furfural aniline resin | 5 |
| Acetone | 100 |
| Diacetone alcohol | 20 |

In the above examples, the cellulose acetate may be of any of the various types, high or low viscosity, acetone or chloroform soluble, and may be replaced in part, or wholly, by other cellulosic derivatives such as the propionate, butyrate, etc.

The term phenol is, in the references to phenol formaldehyde and phenol furfural resins, to be understood to include, besides hydroxybenzol ($C_6H_5OH$), all homologues and also polyphenols such as resorcin and the like and the naphthols and their derivatives with a free hydroxyl group. Also compounds having free hydroxyl groups such as methylene diphenol $CH_2(C_6H_4OH)_2$, diphenylol propane $(CH_3)_2C(C_6H_4OH)_2$, and similar compounds in which the phenyl group is replaced by the naphthyl group may be used to prepare the resin.

It is to be understood that the foregoing details are given merely by way of illustration and that many variations may be made therein without departing from the spirit of this invention.

Having described my invention, what I claim and desire to secure by Letters Patent is:

1. A coating composition containing a derivative of cellulose, an acetone furfural resin, a phenol aldehyde resin and a solvent therefor the proportions of resins being such as to produce a light-fast film.

2. A coating composition containing cellulose acetate, an acetone furfural resin, a phenol aldehyde resin and a solvent therefor, the proportions of resins being such as to produce a light-fast film.

3. A coating composition containing cellulose acetate, an acetone furfural resin prepared in the presence of an alkaline catalyst, a phenol aldehyde resin prepared in the presence of an acid catalyst and a volatile solvent therefor the proportions of resins being such as to produce a light-fast film.

4. A coating composition containing cellulose acetate, an acetone furfural resin prepared in the presence of an alkaline catalyst, a phenol aldehyde resin prepared in the presence of an acid catalyst, a natural resin or gum, and a volatile solvent therefor the proportions of resins being such as to produce a light-fast film.

5. A film containing an organic derivative of cellulose, an acetone furfural resin and a phenol aldehyde resin the proportions of resins being such as to produce a light-fast film.

6. A film containing cellulose acetate, an acetone furfural resin and a phenol aldehyde resin the proportions of resins being such as to produce a light-fast film.

7. A film containing cellulose acetate, an acetone furfural resin, a phenol aldehyde resin, and a natural resin or gum the proportions of resins being such as to produce a light-fast film.

In testimony whereof, I have hereunto subscribed my name.

WILLIAM HENRY MOSS.